United States Patent
Xiong et al.

(10) Patent No.: US 10,457,770 B2
(45) Date of Patent: Oct. 29, 2019

(54) SURFACTANTS FOR POLYURETHANE FOAMS

(71) Applicant: Dow Global Technologies LLC, Midland, MI (US)

(72) Inventors: Jiawen Xiong, Shanghai (CN); Dachao Li, Royersford, PA (US); Jianxin Zhang, Shanghai (CN); David Hong-fei Guo, Shanghai (CN); Beilei Wang, Shanghai (CN); Wei Liu, Shanghai (CN)

(73) Assignee: Dow Global Technologies, LLC, Midland, MI (US)

( * ) Notice: Subject to any disclaimer, the term of this patent is extended or adjusted under 35 U.S.C. 154(b) by 93 days.

(21) Appl. No.: 15/533,391

(22) PCT Filed: Dec. 17, 2014

(86) PCT No.: PCT/CN2014/094104
§ 371 (c)(1),
(2) Date: Jun. 6, 2017

(87) PCT Pub. No.: WO2016/095128
PCT Pub. Date: Jun. 23, 2016

(65) Prior Publication Data
US 2017/0320999 A1    Nov. 9, 2017

(51) Int. Cl.
*C08G 18/08* (2006.01)
*C08G 18/48* (2006.01)
(Continued)

(52) U.S. Cl.
CPC ............. *C08G 18/78* (2013.01); *C08G 18/14* (2013.01); *C08G 18/1808* (2013.01);
(Continued)

(58) Field of Classification Search
CPC ............... C08G 18/713; C08G 18/773; C08G 18/1808; C08G 18/1816; C08G 18/14;
(Continued)

(56) References Cited

U.S. PATENT DOCUMENTS

| 4,920,190 A | 4/1990 | Lina et al. |
| 5,496,642 A | 3/1996 | Martinez et al. |

(Continued)

FOREIGN PATENT DOCUMENTS

| CN | 101024743 | 8/2007 |
| EP | 0856018 | 8/1998 |

(Continued)

OTHER PUBLICATIONS

English language abstract of JP-2013060409-A obtained from the European Patent Office on Nov. 19, 2018.*

(Continued)

*Primary Examiner* — Melissa A Rioja
(74) *Attorney, Agent, or Firm* — Brooks, Cameron & Heubsch, PLLC

(57) ABSTRACT

A surfactant and a method of forming the surfactant having the formula (I) where a is an integer from 1 to 10, b is an integer from 0 to 10, $R_1$ is —$CH_3$ or —H, n is an integer from 0 to 20, and $R_2$ is a moiety selected from the group consisting of (II), (III), (IV), (V), (VI), (VII) or (VIII) where m is an integer from 0 to 4. The surfactant can be used in a method for preparing a rigid polyurethane foam.

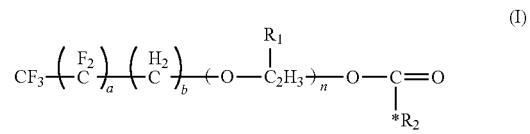

(I)

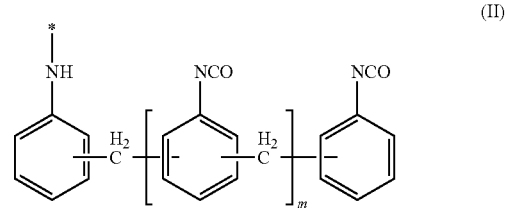

(II)

(III)

(IV)

(V)

(Continued)

(VI)

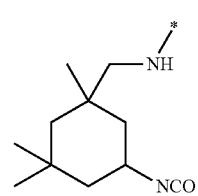

(VII)

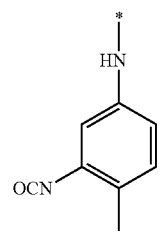

(VIII)

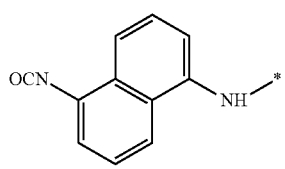

7 Claims, 4 Drawing Sheets

(51) Int. Cl.
| | |
|---|---|
| C08G 18/71 | (2006.01) |
| C08G 18/76 | (2006.01) |
| C08G 18/78 | (2006.01) |
| C08G 18/80 | (2006.01) |
| C08J 9/12 | (2006.01) |
| C08G 18/18 | (2006.01) |
| C08G 18/20 | (2006.01) |
| C08G 18/77 | (2006.01) |
| C08J 9/00 | (2006.01) |
| C08G 101/00 | (2006.01) |

(52) U.S. Cl.
CPC ..... *C08G 18/1816* (2013.01); *C08G 18/2036* (2013.01); *C08G 18/4816* (2013.01); *C08G 18/4829* (2013.01); *C08G 18/714* (2013.01); *C08G 18/7664* (2013.01); *C08G 18/8087* (2013.01); *C08J 9/122* (2013.01); *C08G 18/773* (2013.01); *C08G 2101/0025* (2013.01); *C08J 9/0019* (2013.01); *C08J 2203/06* (2013.01); *C08J 2203/08* (2013.01); *C08J 2205/044* (2013.01); *C08J 2205/05* (2013.01); *C08J 2205/10* (2013.01); *C08J 2375/08* (2013.01)

(58) Field of Classification Search
CPC ............ C08G 18/2306; C08G 18/4816; C08G 18/4829; C08G 18/714; C08G 18/7664; C08G 18/8087; C08J 9/0019; C08J 9/122; C08J 2375/08
See application file for complete search history.

(56) References Cited

U.S. PATENT DOCUMENTS

| | | |
|---|---|---|
| 8,128,711 B2 | 3/2012 | Qiu et al. |
| 2003/0032688 A1 | 2/2003 | Hotta et al. |
| 2009/0054588 A1 | 2/2009 | Maier et al. |
| 2011/0196055 A1 | 8/2011 | Hans et al. |
| 2012/0053252 A1 | 3/2012 | Ober et al. |

FOREIGN PATENT DOCUMENTS

| | | | |
|---|---|---|---|
| JP | S53-112855 | | 10/1978 |
| JP | S61-63646 | | 4/1986 |
| JP | 2013060409 | | 4/2013 |
| JP | 2013060409 A | * | 4/2013 |

OTHER PUBLICATIONS

Machine translation of Detailed Description of JP-2013060409-A obtained from the European Patent Office on Nov. 19, 2018.*
International Search Report and Written Opinion for related PCT Application PCT/CN2014/094104, dated Sep. 22, 2015 (12 pgs).
International Preliminary Report on Patentability for related PCT Application PCT/CN2014/094104 dated Apr. 19, 2017 (14 pgs).

* cited by examiner

SURFACTANTS FOR POLYURETHANE FOAMS

This application is a National Stage Application under 35 U.S.C. § 371 of International Application Number PCT/CN2014/094104, filed Dec. 17, 2017 and published as WO 2016/095128 A1 on Jun. 23, 2016, the entire contents of which are incorporated herein by reference in its entirety.

TECHNICAL FIELD

The present disclosure relates generally to surfactants, and more particularly to surfactants for use in producing polyurethane foams.

BACKGROUND

Rigid polyurethane (PU) foam is widely used in appliance and building industries due to its excellent thermal insulation property. Using rigid PU foam with improved thermal insulation performance is one objective for appliance manufacturers. It is known that the thermal conductivity (Lambda, λ) of rigid PU foam is attributed to at least heat conduction through the gas contained in the rigid PU foam (gas conductivity), conduction through the solid structure of the rigid PU foam (solid conductivity) and from the radiant heat transfer of the rigid PU foam. In conventional rigid PU foams used for appliance, gas conductivity accounts for about 60-70% of the total lambda value. One conventional method to minimize gas conductivity is to use certain types of blowing agents such as hydrochlorofluorocarbons (HCFC, e.g., HCFC141b), hydrofluorocarbons (e.g., HFC245fa), hydrofluoroolefines (HFOs), hydrocarbons (e.g., c-pentane), and mixtures thereof in the production of the rigid PU foams. Some of these gases, however, are known to have ozone depletion potential (ODP) or global warming potential (GWP).

Another approach to minimize gas conductivity is to limit the number of energy exchanging collisions between gas molecules in the cells of the rigid PU foam. Minimizing the number of collisions between gas molecules in the cells can effectively reduce gas conductivity without the use of HCFC, HFC, HFOs or hydrocarbons. To achieve this result the size of the cells of the rigid PU foam needs to be close to or smaller than the mean free path of gas molecules between collisions. This is known as the "Knudsen effect" and can be achieved either by reducing the size of the cells, by reducing the gas pressure inside the cells, or both.

Foaming methods used with rigid PU foams do not, however, readily achieve cell size below about 180 micrometer (μm). For such foams, strong vacuum needs to be applied (<1 mbar, often <0.1 mbar) to achieve conditions under which the Knudsen effect becomes significant. Thus, there is a need for rigid PU foams having small cells that can achieve low thermal conductivity values (e.g., less than 18 mW/m-K) without the need of very strong vacuum or for the use of gases that have ODP or GWP.

As a green blowing agent with zero ODP and negligible GWP, supercritical carbon dioxide ($ScCO_2$) has drawn the interest in foaming industry and may be a promising blowing agent in producing microcellular or even nano-cellular foams for thermoplastic polymers. It has been suggested that $ScCO_2$ can also be used in thermosetting polymers. For example, $ScCO_2$ has been used in preparing rigid PU nano-foams. A surfactant is typically used in preparing rigid PU nano-foams with $ScCO_2$. The loading level and type of surfactant used in preparing rigid PU nano-foams can have an impact on the quality of the resulting rigid PU foam. Fluorocarbon and/or fluoroether based surfactants are known to be compatible with PU foaming systems that use $ScCO_2$. These perfluoro-based surfactants, however, can be very expensive and more concerning may escape from, the PU foams due to their low molecular weight. As such, the use of such perfluoro-based surfactants is limited. Thus, there is a need in the art to develop perfluoro-based surfactants that have a high performance-to-cost ratio.

SUMMARY

The present disclosure provides for a fluorine containing surfactant that addresses the issues present in above mentioned perfluoro-based surfactants. The surfactant of the present disclosure has the formula:

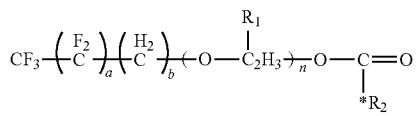

where a is an integer from 1 to 10, b is an integer from 0 to 10, $R_1$ is —$CH_3$ or —H, n is an integer from 0 to 20, and $R_2$ is a moiety selected from the group consisting of;

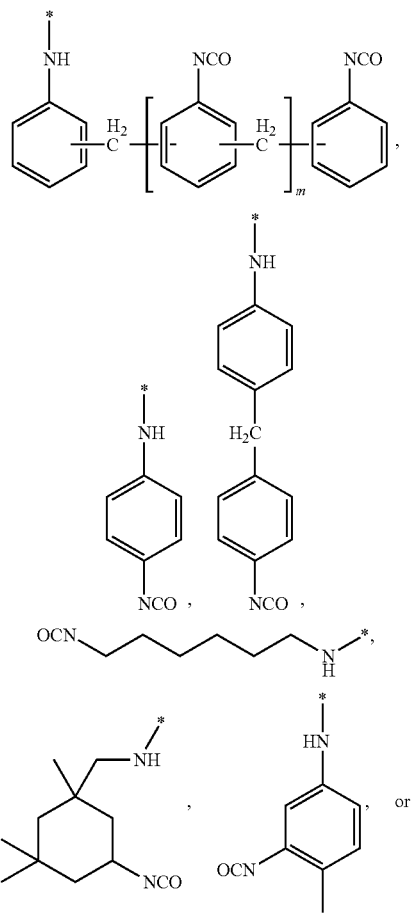

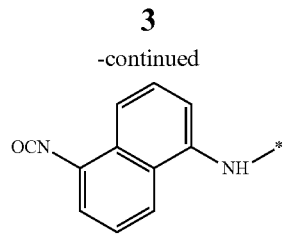

where m is an integer from 0 to 4. Examples of the surfactant of the present disclosure include the following formulae. When m is 0, the formula is:

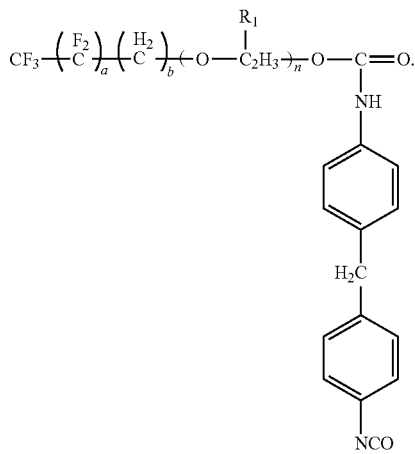

Alternatively, the formula is:

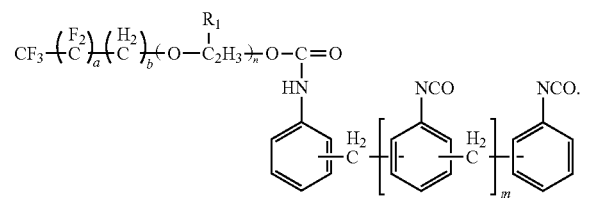

For these examples, and other discussed herein, of the surfactant a can be an integer from 5 to 7, b can be an integer from 2 to 10 and $R_1$ is —H. In a specific embodiment, a is 7, while b can be an integer from 2 to 10 and $R_1$ is —H.

The present disclosure also provides for a method of preparing the surfactant. The method includes reacting a first compound having the formula:

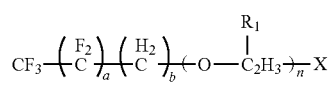

where a is an integer having a value from 1 to 10, b is an integer having a value from 0 to 10, $R_1$ is —$CH_3$ or —H and n is an integer having a value from 0 to 20, and X is —OH, —COOH, —$NR_2$ or —SH, with a second compound having the formula selected from the group consisting of:

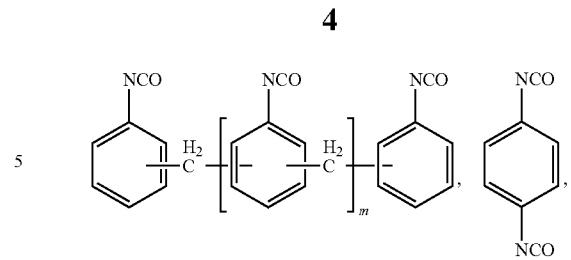

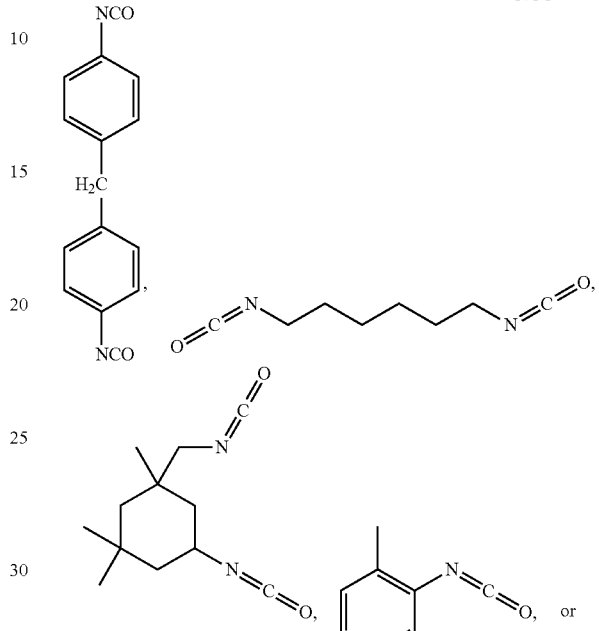

where m is an integer having a value from 0 to 4.

In a specific embodiment, the first compound can have the formula:

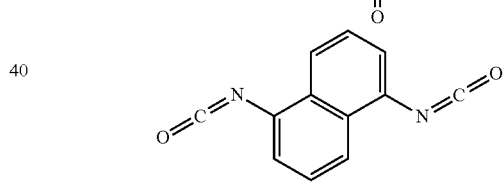

Reacting the first compound with the second compound can occur at a temperature of 0° C. to 100° C.

The surfactant is also used in preparing a rigid polyurethane foam. The method of preparing the rigid polyurethane foam can include using carbon dioxide to provide a pressure at a first predetermined value on a polyol mixture that includes a polyol, a catalyst and the surfactant of the present disclosure; maintaining the pressure at the first predetermined value for a first predetermined time mixing an isocyanate with the polyol mixture to form a polyurethane reaction mixture; optionally maintaining the pressure on the polyurethane reaction mixture at the first predetermined value for a second predetermined time; increasing the pressure on the polyurethane reaction mixture from the first predetermined value to a second predetermined value greater than the first predetermined value; and releasing the polyurethane reaction mixture at a predetermined depressurization rate from the pressure after a third predetermined time to prepare the rigid polyurethane foam, where the third predetermined time is less than 30 minutes.

For the method, the first predetermined value can be from 5 megapascal (MPa) to 10 MPa at a temperature of 40 degrees Celsius (° C.) to 80° C. The first predetermined time can be from 30 seconds (s) to 300 s. The second predetermined value can be from greater than 10 MPa to 15 MPa at a temperature of 31° C. to 80° C.

The carbon dioxide used to provide the pressure at the first predetermined value on the polyol mixture can include using carbon dioxide in a supercritical state to provide the pressure at the first predetermined value on the polyol mixture. Optionally maintaining the pressure on the polyurethane reaction mixture at the first predetermined value for the second predetermined time can help to increase a carbon dioxide content of the polyurethane reaction mixture to a value of at least 20 weight percent based on the total weight of the polyol mixture after the first predetermined time, For the method the polyol mixture can have a number averaged functionality of at least 2 and an average hydroxyl value of at least 100 mg KOH/g. The polyol can be selected from the group consisting of a polyether polyol, a polyester polyol or a combination thereof. The isocyanate is selected from the group consisting of an aliphatic isocyanate, a cycloaliphatic isocyanate, an aromatic isocyanate, a polyisocyanate prepolymer or a combination thereof.

The predetermined depressurization rate can be 350 MPa/s or less. When mixing the isocyanate with the polyol mixture to form the polyurethane reaction mixture provides a molar ratio of isocyanate groups to hydroxyl groups can be greater than 1 to 1. A vacuum can also be applied to the rigid polyurethane foam during the method of its production.

DETAILED DESCRIPTION

Definitions

Figure 1:
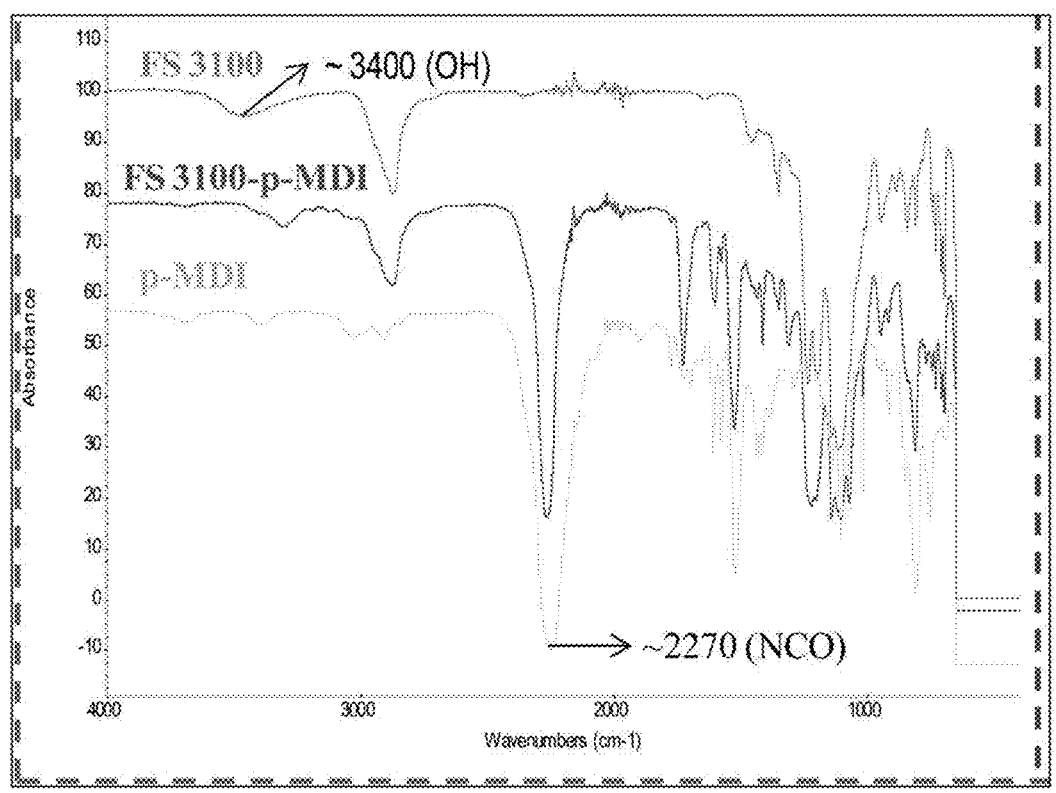
FIG. 1 shows the IR curves for Capstone® FS3100, Papi-27 and Examples 1 of the present disclosure.

As used herein "rigid polyurethane (PU) foam" is a PU foam that have an elastic region in which strain is nearly proportional to stress; which when compressed beyond its yield point the cell structure is crashed; where the compressive strength values of 10 to 280 kPa (1.45-40.6 psi) can be obtained using rigid PU foams having a density of at least 40 kg/m$^3$. In addition, the elastic modulus, shear strength, flexural strength, and tensile strength all increase with density.

As used herein "number average cell size" "D" is calculated using the following equation:

$$D = \frac{\sum d_i n_i}{\sum n_i}$$

where $n_i$ is the number of cells with a perimeter-equivalent diameter of $d_i$.

The rigid PU foam can be characterized in having a calculated molecular weight between crosslinks. The calculated molecular weight between crosslinks (Mc) takes into account the functionality (number of isocyanate or isocyanate-reactive groups per molecular) and equivalent weight of those polyisocyanate compounds and of those isocyanate-reactive compounds together with the isocyanate index, as follows;

$$\text{Crosslink Density} = 1000/\text{Mc}$$

$$Mc = \frac{Wpol + Wiso}{\frac{Wpol(Fpol-2)}{Epol \times Fpol} + \frac{Wiso, stoich(Fiso-2)}{Eiso \times Fiso} + \frac{Wiso, exc(Fiso-1)}{Eiso(Fisco+1)}}$$

Wpol is the weight of the polyol; Wiso is the weight of the isocyanate; Wiso,stoich is the weight of the stoichiometric amount of isocyanate in grams; Wiso,exc is the weight of the isocyanate exceeding the stoichiometric amount; iso is isocyanate; pol is polyol; F is the numerical average functionality of the components; and E is the equivalent weight of the components.

As used herein, "porosity" is defined as a measure of the void (i.e., "empty") spaces in a material, and is a fraction of the volume of voids over the total volume, between 0-1, or as a percentage between 0-100%. Porosity is determined using ASTM D792-00 or EN ISO 845.

As used herein, carbon dioxide "saturation" is defined as a weight percent of $CO_2$ that has been dissolved in a solution (e.g., the polyol mixture and/or the polyurethane reaction mixture) compared to the saturation equilibrium level, and is measured using a magnetic suspension balance.

As used herein, an "open cell" of the rigid PU foam is defined as the cell which is not completely closed and directly or indirectly interconnecting with other cells, and is measured according to ASTM D2856.

As used herein, a "closed cell" of the rigid PU foam is defined as the cell which is completely closed and non-connecting with any other cells, and is measured according to ASTM D2856.

As used herein, carbon dioxide in a "subcritical state" is defined as carbon dioxide with a pressure of no less than 5 megapascal(MPa) and no larger than the critical pressure of 7.3 MPa for a temperature of at least 0° C.

As used herein, carbon dioxide in a "supercritical state" is defined as $CO_2$ under a pressure of at least the critical pressure of 7.3 MPa and a temperature of at least the critical temperature of 31.3° C.

The present disclosure provides for a fluorine containing surfactant that addresses the issues present in above mentioned perfluloro-based surfactants. The surfactant of the present disclosure is a reaction product of a diisocyanate and a fluoro-compound that produces a fluoro-isocyanate. As discussed herein, the diisocyanate and the fluoro-compound react to form an oligomer with a number average molecular weight of at least 1000 grams/mole. This number average molecular weight can help to make the surfactant of the present disclosure less volatile, while the isocyanate of the surfactant helps to chemically bond the surfactant in the resulting rigid PU foam. In addition, the diisocyanate(s) and the fluoro-compound(s) used in forming the surfactant of the present disclosure can be selected to minimize the overall cost of the surfactant, relative other perfluloro-based surfactants. The surfactant of the present disclosure may also enhance the solubilization of liphophilic and hydrophilic phases present during the production of rigid PU foam with $ScCO_2$, which can result in improved properties of the rigid PU foam.

The surfactant of the present disclosure has the formula:

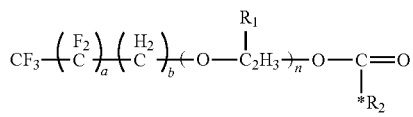

where a is an integer from 1 to 10, b is ail integer from 0 to 10, $R_1$ is —$CH_3$ or —H, n is an integer from 0 to 20, and $R_2$ is a moiety selected from the group consisting of:

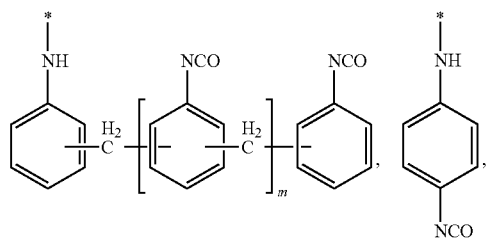

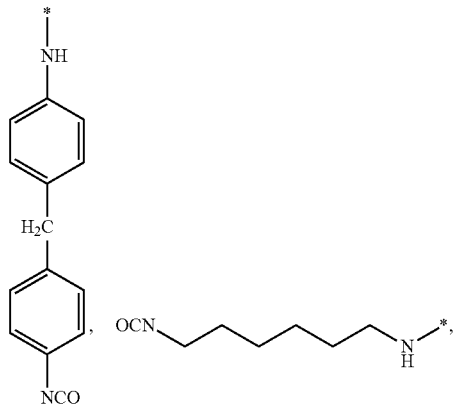

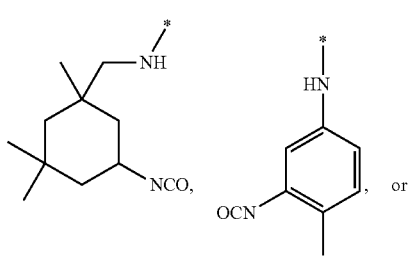

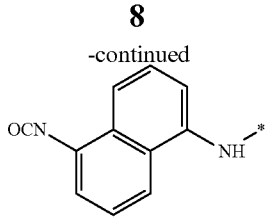

where m is an integer from 0 to 4.

A variety of values are possible for a, b and/or n. For example, a can be an integer having a lower value of 0, 1, 2, 3 or 4 and an upper value of 5, 6, 7, 8, 9 or 10, where any combination of a lower value and an upper value are possible. A variety of values are also possible for b. For example, b can be an integer having a lower value of 0, 1,2, 3 or 4 and an upper value of 5, 6, 7, 8, 9 or 10, where any combination of a lower value and an upper value are possible. A variety of values are similarly possible n. For example, n can be an integer having a lower value of 0, 1, 2, 3, 4, 5, 6, 7, 8 or 9 and an upper value of 10, 11, 12, 13, 14, 15, 16, 17, 18, 19 or 20, where any combination of a lower value and an upper value are possible.

As discussed herein, the surfactant of the present disclosure may enhance the solubilization of liphophilic and hydrophilic phases present during the production of rigid PU foam with $ScCO_2$. Different portions of the surfactant can help in achieving these properties. For example, the perfluoro-structual tail of the surfactant (e.g., $CF_3$—(—$CF_2$—)$_a$—) of the present disclosure can bring the lipophilic properties to the surfactant (e.g., has good compatibility with $ScCO_2$ ), while the ethylene based repeating unit (—O—$C_2(R_1)H_3$—) brings at least a portion of the hydrophilic properties to the surfactant, where additional hydrophilic properties can be brought by the ester group in the surfactant. As appreciated, changing the number of either of these repeating units through the selection of values for a and n can influence the liphophilic and/or the hydrophilic properties of the surfactant. In addition, the value of (a+b)/n can influence the hydrophilic and lipophilic properties of the surfactant. For example, increasing the value of (a+b)/n can lead to better the lipophilic properties, while lowering the value of (a+b)/n can lead to better hydrophilic properties. Both the lipophilic and the hydrophilic properties of the surfactant can help to provide highly effective emulsification with a $ScCO_2$ system.

As illustrated above, each of the $R_2$ moieties includes an isocyanate functional group. So, in addition to functioning as a surfactant during the production of the rigid PU foam, the presence of the isocyanate functional group allows the surfactant to covalently bond to and/or in the rigid PU foam. When covalently bound, the surfactant will be less likely to leach and/or volatilize from the rigid PU foam.

Preferably, values for a and the selection of the $R_2$ moiety can provide the surfactant with 0.1 weight percent (wt. %) to 50 wt. % fluorine (F) and 3 wt. % to 25 wt. % of the isocyanate functional group, where the wt. % is based on the total weight of the surfactant. More preferably, the values for a and the selection of the $R_2$ moiety can provide the surfactant with 10 wt. % to 25 wt. % fluorine (F) and 10 wt. % to 25 wt. % of the isocyanate functional group, where the wt. % is based on the total weight of the surfactant. Specific examples of these preferred embodiments can be arrived at from the following preferred formula, where m is 0:

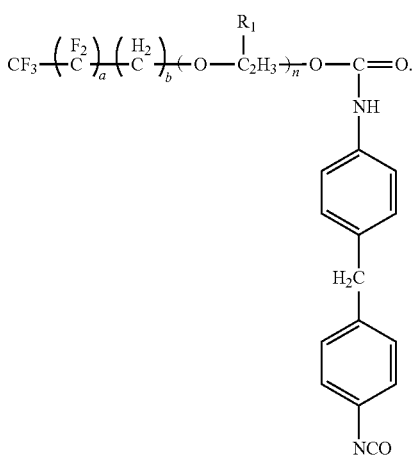

Alternatively, the preferred embodiments can be arrived at from the following preferred formula, where m is not 0:

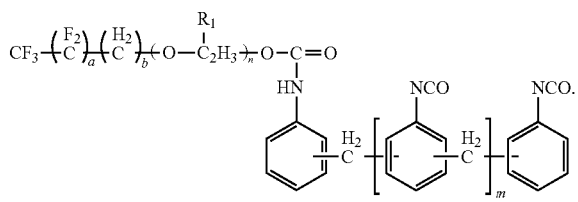

For these examples of the surfactant, and other discussed herein, a can be an integer from 5 to 7, b can be an integer from 2 to 10 and $R_1$ is —H. In a specific embodiment, a is 7, while b can be an integer from 2 to 10 and $R_1$ is —H. Preferably, b is 7, which can help to better ensure the surfactant has good compatibility with water or other polar liquid chemicals.

The surfactant of the present disclosure may be used in polyurethane foaming processes. In these processes, the surfactant helps to decrease the interfacial tension and improve the compatibility of the raw materials, improve the formation and stability of nucleation sites, and help to improve the stability of the growing cells of the expanding foam. For the present disclosure, the surfactant is also chosen to help in stabilizing the interface between the $CO_2$ and the polyol during the two-stage foaming process of the present disclosure. Helping to stabilize the $CO_2$ and polyol interface with the surfactant helps to decrease the collapse and coalescence of formed bubble during the depressurization step (the foaming step) of the present disclosure.

The surfactant of the present disclosure may provide a variety of advantages for systems that use $ScCO_2$. For example, the perfluoro-structual tail and the ethylene based repeating unit (—O—$C_2(R_1)H_3$—) of the surfactant are incompatible because of their polarity differences. This allows the surfactant of the present disclosure to work as effective surfactant in systems that include $ScCO_2$ and hydrophilic solutes. The surfactant of the present disclosure may also work as a reactive component for other thermosetting system such as $CO_2$/polyol system. The surfactant of the present disclosure may also allow for self-emulsification of $ScCO_2$, which may lead to a reduction in the amount of surfactant needed for a given process. Finally, the surfactant of the present disclosure may also help to improve the stability of miscibility for $ScCO_2$ and lipophilic or hydrophilic liquid systems.

The present disclosure also provides for a method of preparing the surfactant. The method includes reacting a first compound having the formula:

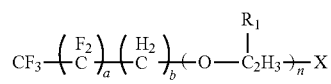

where a is an integer having a value from 1 to 10, b is an integer having a value from 0 to 10, $R_1$ is CH: or —H and n is an integer having a value from 0 to 20, and X is —OH, —COOH, —NH2 or —SH, with a second compound having two or more isocyanate functional groups (e.g., a functionality of 2 to 3). Examples of the second compound include, but are not limited to, 1-isocyanato-4-[(4-isocyanatophenyl)methyl]benzene (4,4'-MDI), 1-isocyanato-2-[(4-isocyanatophenyl)methyl]benzene (2,4'-MDI); polyphenylpolymethylenepolyisocyanates (PMDI); 1-isocyanato-2-[(2-isocyanatophenyl)methyl]benzene (2,2'-MDI); 2,4-diisocyanato-1-methyl-benzene (2,4-TDI); 2,6-diisocyanato-1-methyl-benzene (2,6-TDI); 1,6-diisocyanatohexane (HDD; 5-isocyanato-1-(isocyanatomethyl)-1,3,3-trimethyl-cyclohexane(IPDI); 1,4-Phenylene diisocyanate (PDI); 1,3-bis(isocyanatomethyl)benzene (m-XDI); 1,5-naphthalene diisocyanate (1,5-NDI) and combinations thereof. Preferred examples of the second compound are selected from the group consisting of:

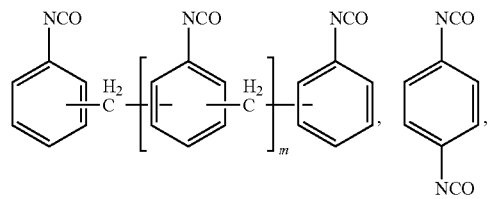

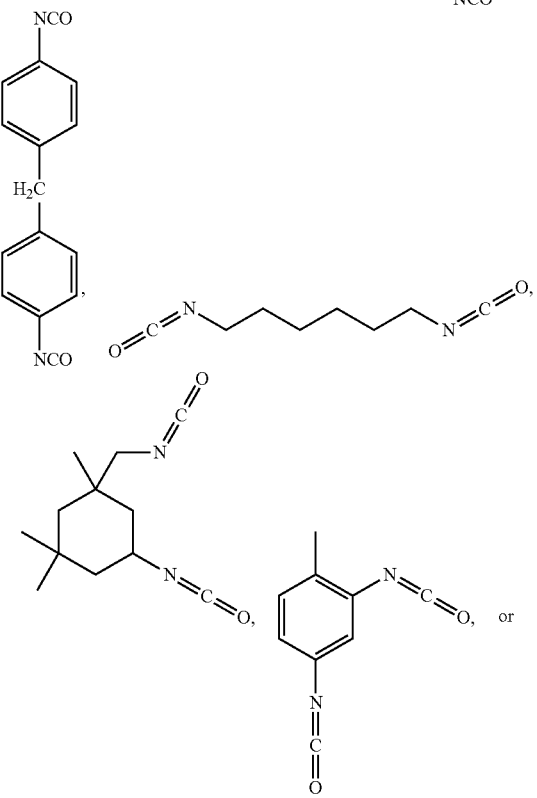

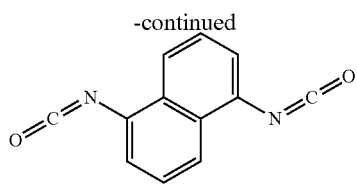

wherein is an integer having a value from 0 to 4.

As discussed herein, a variety of values are possible for a, b and/or n. For example, a can be an integer having a lower value of 0, 1, 2, 3 or 4 and an upper value of 5, 6, 7, 8, 9 or 10, where any combination of a lower value and an upper value are possible. Preferably, a is an integer from 5 to 7.

A variety of values are also possible for b. For example, b can be an integer having a lower value of 0, 1, 2, 3 or 4 and an upper value of 5, 6, 7, 8, 9 or 10, where any combination of a lower value and an upper value are possible. A variety of values are similarly possible n. For example, n can be an integer having a lower value of 0, 1, 2, 3, 4, 5, 6, 7, 8 or 9 and an upper value of 10, 11, 12, 13, 14, 15, 16, 17, 18, 19 or 20, where any combination of a lower value and an upper value are possible.

Examples of the first compound include, but are not limited to, fluoro-surfactants sold under the trade designator Capstone® available from DuPont™, where a preferred example includes Capstone® FS3100. Other suitable examples of fluoro-surfactants include Zonyl® FSO-100 (DuPont™).

In a specific embodiment, the first compound can have the formula;

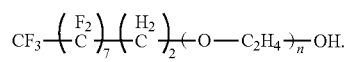

Reacting the first compound and the second compound to form the surfactant of the present disclosure can occur at a temperature of 0° C. to 100° C. The first component can be dried to remove water by, for example, heating the first compound (e.g., 80° C.) under a vacuum and mechanical stirring. The first compound after drying can then be purged with a dry inert gas, such as nitrogen, until its reaction with the second compound. The reaction can take place at atmospheric pressure. Reaction times can range from 2 to 5 hours. The molar ratio of the (—OH) functional group of the first compound to the (—NCO) functional group of the second compound (moles —OH:moles —NCO) can be from 0.1:1 to 0.9:1, with the preferred molar ratio being 0.3:1 to 0.7:1.

The surfactant of the present disclosure can be used in preparing a rigid polyurethane (PU) foam. For example, the surfactant of the present disclosure can be used in a two-stage foaming process, as described herein. It is appreciated, however, that the surfactant of the present disclosure may also be used in other methods of forming PU foams that use carbon dioxide (e.g., supercritical carbon dioxide) as a blowing agent.

Preferably, the number average cell size of the rigid PU foam of the present disclosure is no greater than 10 μm, which would enable the Knudsen effect at pressures higher than 1 millibar (mbar), or even higher than 10 mbar. Additionally, the method to make the rigid PU foam of the present disclosure preferably uses supercritical carbon dioxide (scCO$_2$) as the blowing agent, which can reduce cost and help protect the environment.

The method of the present disclosure includes a two-stage CO$_2$ pressurization process in forming the rigid PU foam. In the first stage of the two-stage CO$_2$ pressurization process the method includes using CO$_2$ to provide a pressure having a first predetermined value on a polyol mixture. The polyol mixture includes a polyol, a catalyst and the surfactant of the present disclosure. The polyol mixture can also include one or more additional compounds, as discussed herein. The CO$_2$ used to provide the pressure having a first predetermined value on a polyol mixture can be in either a subcritical state or a supercritical state. The pressure at the first predetermined value is maintained for a first predetermined time. Maintaining the pressure having the first predetermined value on the polyol mixture can be done with (CK For example, CO$_2$ can be supplied to a vessel (e.g., pumped into the vessel) containing the polyol mixture in order to maintain the pressure at the first predetermined value. Alternatively, the volume of a head-space containing the CO$_2$ above the polyol mixture can be reduced, thereby maintaining the pressure at the first predetermined value on the polyol mixture. Maintaining the pressure at the first predetermined value for the first predetermined time increases a CO$_2$ content of the polyol mixture.

An isocyanate, as discussed herein, is mixed with the polyol mixture to form a polyurethane reaction mixture. The pressure on the polyurethane reaction mixture is also optionally maintained at the first predetermined value for a second predetermined time. Maintaining the pressure on the polyurethane reaction mixture at the first predetermined value for the second predetermined time can be done as described above for the first predetermined time. During the second predetermined time, when used, the isocyanate and the polyol mixture in the polyurethane reaction mixture start to react under the CO$_2$ pressure at the first predetermined value. In addition, optionally maintaining the pressure at the first predetermined value for the second predetermined time can increase the CO$_2$ content of the polyurethane reaction mixture to a value of at least 20 weight percent based (up to the saturation value) on the total weight of the polyol mixture after the first predetermined time.

After the second predetermined time (when used), the pressure on the polyurethane reaction mixture is increased from the first predetermined value to a second predetermined value greater than the first predetermined value. The changes in pressure from the first predetermined value to a second predetermined value can be done in a stepwise fashion or in a rate controlled fashion over a predetermined amount of time (e.g., having a ramp or a curve pressure change profile). Increasing the pressure on the polyurethane reaction mixture from the first predetermined value to the second predetermined value can be done as described above for the first predetermined time. So, for example, CO$_2$ can be supplied to a vessel (e.g., pumped into the vessel) containing the polyurethane reaction mixture in order to increase the pressure from the first predetermined value to the second predetermined value. Alternatively, the volume of a head-space containing the CO$_2$ above the polyurethane reaction mixture can be reduced, thereby increasing the pressure from the first predetermined value to the second predetermined value.

The increase in pressure from the first predetermined value to the second predetermined value starts the second stage of the two-stage CO$_2$ pressurization process. During this second stage of the two-stage CO$_2$ pressurization process the isocyanate continues to react with the polyol mixture in the polyurethane reaction mixture under the CO$_2$ pressurization at the second predetermined value for a third predetermined time, where the third predetermined time is less than 30 minutes. After the third predetermined time the polyurethane reaction mixture is released at a predetermined depressurization rate from the pressure to prepare the rigid PU foam.

The rigid PU foam formed in the two-stage $CO_2$ pressurization process can also have a crosslink density from 1.0 to 3.0 and a weight average molecular weight (Mw) per cross-link from 300 to 900. In a preferred embodiment, the rigid PU foam of the present disclosure has a Mw per cross-link from 400 to 900.In a preferred embodiment, the rigid PU foam of the present disclosure has a crosslink density from 1.15 to 3.0. In another preferred embodiment, the rigid PU foam of the present disclosure has a crosslink density from and 1.5 to 2.5. The crosslink density has been discovered to have a significant influence on the number average cell size of the rigid PU foam. For example, when the crosslink density of the rigid PU foam goes from 2.98 to 1.76 the number average cell size of the rigid PU foam goes from 40 µm to 5-8 µm. As such, the number average cell size can be effectively reduced by changing crosslink density of the rigid PU foam.

Preferably, the rigid PU foam formed in this two-stage $CO_2$ pressurization process also has a porosity of no less than 85 percent. It is also possible to produce a rigid PU foam formed in the two-stage $CO_2$ pressurization process having a porosity of less than 90 percent, if desired. According to some embodiments, the rigid PU foam can have a volume percentage of closed cells of no greater than 35 percent based on all the cells in the rigid PU foam. The rigid PU foam can also have a percentage of open cells that can be tuned from less than 35 percent (%) to greater than 95 % based on all the cells in the rigid PU foam. So, the rigid PU foam of the present disclosure can have an open cell volume of at least 35% based on all the cells in the rigid PU foam. Preferably, the rigid PU foam of the present disclosure can have an open cell volume content from 35% to 95% based on all the cells in the rigid PU foam. These percentage values can be determined using ASTM D2856, as stated above.

The method for preparing the rigid PU foam of the present disclosure can be performed in a batch process using a single vessel. Alternatively, the method for preparing the rigid PU foam of the present disclosure can be performed in two or more vessels using a batch, a semi-batch or a continuous process. For example, in a process that uses a single vessel (e.g., in a batch process) the first stage of the two-stage $CO_2$ pressurization process can include using $CO_2$ to provide a pressure at a first predetermined value on the polyol mixture in the vessel. In this first stage, if a gaseous environment is present above the polyol mixture in the vessel (e.g., a headspace is present) it can be purged with $CO_2$ prior to using the $CO_2$ to provide the pressure at the first predetermined value on the polyol mixture. Purging with $CO_2$ can help to remove water vapor, oxygen and other gases from the headspace of the vessel, The $CO_2$ used to provide the pressure at the first predetermined value on the polyol mixture in the vessel can be in either a subcritical state or a supercritical state, as discussed herein. The pressure at the first predetermined value is maintained inside the vessel, as discussed herein (e.g., using $CO_2$ in either a subcritical state or a supercritical state) for the first predetermined time to increase the $CO_2$ content of the polyol mixture.

The amount of $CO_2$ dissolved into the polyol mixture is calculated by modeling and it is used to estimate the required time to obtain a certain degree of $CO_2$ saturation in the polyol mixture for given temperature and pressure conditions. In other words, the $CO_2$ dissolved into the polyol of the polyol mixture can be estimated from modeling software, which in turn can provide estimates for the required time at a given temperature and pressure of $CO_2$ to obtain the desired degree of $CO_2$ saturation in the polyol mixture. The exact amount of time for the first predetermined time can depend upon the specific equipment used and is strongly dependent on the contact area between the liquid phase of the polyol mixture and the phase of the $CO_2$ and the mixing equipment, if any, that is used. Preferably, the first predetermined time is keep to a minimum in order to improve production rates. For example, the first predetermined time can preferably be from 30 seconds (s) to 300 s. It is appreciated, however, that values for the first predetermined time can be shorter than 30 s or longer than 300 s. For example, it might be possible to hold the polyol mixture under the pressure at the first predetermined value for hours or even days, if desired, without any foreseeable issues to the method for preparing the rigid PU foam.

One goal in providing the pressure at the first predetermined value is to dissolve $CO_2$ into the polyol mixture. Dissolving $CO_2$ in the polyol mixture helps to modify the reaction kinetics of the polyurethane reaction once the isocyanate is added to the polyol mixture. Preferably, the amount of $CO_2$ present in the polyol mixture is at full saturation for the given temperature and pressure. In this way, a polyol mixture that has a saturated amount of $CO_2$ can be formed and stored for mixing with the isocyanate, as discussed herein. Preferably, optionally maintaining the pressure at the first predetermined value for the second predetermined time can increase a $CO_2$ content of the polyurethane reaction mixture to a value of at least 20 weight percent based on the total weight of the polyol mixture after the first predetermined time.

The temperature and the pressure of the polyol mixture and of the $CO_2$ to provide the pressure at the first predetermined value on the polyol mixture and for maintaining the pressure at the first predetermined value for the first predetermined time (the first stage of the two-stage $CO_2$ pressurization process) is sufficient to maintain the $CO_2$ in either a subcritical state or a supercritical state. For example, the first predetermined value can be from 5 megapascal (MPa) to 10 MPa at a temperature of 40 degrees Celsius (° C.) to 80° C., This range of pressures and temperatures allows for $CO_2$ in either the subcritical state or the supercritical state. For example, for temperatures of 40 degrees ° C. to 80° C. the $CO_2$ will be in a supercritical state for the first predetermined value for the pressures of at least 7.29 MPa to 10 MPa. For temperatures of 40° C. to 80° C. the $CO_2$ will be in a subcritical state for the first predetermined value for the pressures of 5 MPa to less than 7.29 MPa. Preferably, the $CO_2$ used to provide the pressure at the first predetermined value is in a supercritical state. In addition to these preferred pressures and temperatures for the $CO_2$ it is also possible that the $CO_2$ used to provide the pressure at the first predetermined value can have a temperature in a range from at least 31.1° C. to 100° C. For this temperature range (31.1° C. to 100° C.), the $CO_2$ will be in a supercritical state at a first predetermined value for the pressure of at least 7.29 MPa.

The temperature of the polyol mixture at the first stage of the two-stage $CO_2$ pressurization process can influence the reaction rate of the polyol and the isocyanate in the polyurethane reaction mixture during the second stage of the two-stage $CO_2$ pressurization process. If the temperature of the polyol mixture during the first stage is too high, the polyol mixture will have to be cooled prior to it being mixed with the isocyanate in order to manage the reaction kinetics.

Cooling the polyol mixture prior to adding the isocyanate is possible, but would shift the polyol-$CO_2$ equilibrium established during the first stage of the method and it would add significant additional complexity. It is thus preferred to carry out the first stage of the two-stage $CO_2$ pressurization process at a temperature lower than or equal to that of the second stage of the two-stage $CO_2$ pressurization process.

As discussed herein, using carbon dioxide to provide a pressure at the first predetermined value on the polyol mixture during the first stage of the two-stage $CO_2$ pressurization process helps to build up the initial $CO_2$ concentration in the polyol mixture. The $CO_2$ concentration in the polyol mixture in turn helps to slow down (or decrease) the reaction rate of the polyol and the isocyanate, so that in the second stage of the two-stage $CO_2$ pressurization process there will be enough time for more $CO_2$ to dissolve into the polyurethane reaction mixture. The choice of the second predetermined value for the pressure of $CO_2$ in the second stage of the two-stage $CO_2$ pressurization process can be influenced by such factors as: the state of the $CO_2$ (supercritical or subcritical); the density difference between the polyol mixture and $CO_2$ phase (for mixing); and the initial $CO_2$ concentration in the polyol mixture and corresponding reaction rate of the polyol and the isocyanate. Using these principles, it has been determined that the $CO_2$ used to increase the pressure on the polyurethane reaction mixture from the first predetermined value to the second predetermined value greater than the first predetermined value (the second stage of the two-stage $CO_2$ pressurization process) should be in a supercritical state. As discussed herein, $CO_2$ is in a supercritical state at a temperature of at least 31.1° C. and a pressure of at least 7.29 MPa. Preferably, the second predetermined value for the pressure of the $CO_2$ is from greater than 10 MPa to 15 MPa at a temperature of 31° C. to 80° C.

The density difference between the polyol in the polyol mixture and the $CO_2$ in the reactor during either the first stage or the second stage of the two-stage $CO_2$ pressurization process is also taken into consideration in selecting the temperature of the polyol mixture and the temperature and pressure of the $CO_2$ used during these two stages. For example, one goal during these stages is to minimize the dissolution of polyol into the $CO_2$. The preferred state consists of a large amount of $CO_2$ dissolved in the polyol mixture and very little or no polyol dissolved in the $CO_2$. Dissolution of the polyol into the $CO_2$ becomes easier as the density of the $CO_2$ increases and approaches the density of the polyol mixture. The density of $CO_2$ increases with increasing pressure for a set temperature. Consequently the pressure of the $CO_2$ should be set as high as possible (large driving force for polyol saturation), but low enough to maintain a sufficient barrier to polyol dissolution into the $CO_2$. Because of the change in density value for $CO_2$ with pressure above a certain point (dependent on temperature), it is further preferred that the first predetermined value for the pressure should not be higher than 8 MPa at 40° C., not higher than 8.9 MPa at 50° C. and not higher than 9.8 MPa at 60°C. In short, considering the factors listed above, the most preferable first predetermined value would be from 7 MPa to 8 MPa at a temperature of 40° C. to 80° C.

As discussed herein, the isocyanate is mixed with the polyol mixture to form the polyurethane reaction mixture. For the various embodiments, mixing the isocyanate with the polyol mixture to form the polyurethane reaction mixture in the vessel at the first reaction pressure provides a molar ratio of isocyanate groups to hydroxyl groups of 1 to 1 or greater. For example, mixing the isocyanate with the polyol mixture to form the polyurethane reaction mixture in the vessel at the first reaction pressure can provide a molar ratio of isocyanate groups to hydroxyl groups of 1 to 1.1.

For the present disclosure, a mixing time of 90 seconds is sufficient to achieve adequate mixing of the polyol mixture and the isocyanate. The first reaction pressure of $CO_2$ is maintained in the vessel during the mixing of the isocyanate. The first reaction pressure of the $CO_2$ in the vessel containing the isocyanate and the polyol mixture is optionally maintained for a second predetermined time during which the isocyanate and the polyol mixture can react under the first stage $CO_2$ pressure. The second predetermined time allows for reaction between the polyol and isocyanate components to increase the molecular weight of the mixture, the degree of crosslinking in the growing polymer network of the polyurethane reaction mixture and to build viscosity of the polyurethane reaction mixture. The second predetermined time also helps to prevent the dissolution of the polyurethane reaction mixture (e.g., polymer, isocyanate, polyol) into the $CO_2$ phase during the next processing step. Preferably, the second predetermined time is from 30 to 300 seconds.

After the second predetermined time (if used), the pressure in the vessel is increased, as discussed herein, from the first reaction pressure to a second reaction pressure greater than the first reaction pressure. This second reaction pressure helps to determine the density of the rigid PU foam and can be adjusted to achieve the desired density. A lower pressure at this stage will result in a rigid PU foam with higher density (e.g., 350 kg/m$^3$) and a higher pressure in a foam with a lower density (e.g., 110 kg/m$^3$).

The isocyanate reacts with the polyol mixture in the vessel at the second reaction pressure for a third predetermined time. The third predetermined time needs to be long enough to allow for the required amount of $CO_2$ to dissolve into the polyurethane reaction mixture to achieve the desired final foam density. Similar to what was discussed for the first step, the length of the third predetermined time can depend on the mixing conditions, contact area between phases, density and viscosity differences and the pressure in the reactor. The third predetermined time needs to be long enough so that the system builds up sufficiently high viscosity/crosslinking to give the desired cell size during the pressure release step. The third predetermined time should be short enough to prevent the reacting mixture from reaching too high a viscosity and cross-link density that expansion during the depressurization step does not lead the desired density. Preferably, the third predetermined time is less than 30 minutes, and more preferably less than 780 seconds.

After the third predetermined time, the polyurethane reaction mixture at the second reaction pressure in the vessel is released at a predetermined depressurization rate to form the rigid PU foam. The predetermined depressurization rate determines the nucleation energy barrier and number of initial nucleation sites in forming polymer matrix of the rigid PU foam. The higher depressurization rate is the lower energy barrier will be and the more nucleation sites there will be. It is preferable to achieve as high depressurization rate as possible to promote the nucleation and produce smaller ceil size and higher porosity. Preferably, releasing the polyurethane reaction mixture at the predetermined depressurization rate from the pressure after the third predetermined time to prepare the rigid polyurethane foam is done at a rate of 350 MPa/s or less. Preferably, the predetermined depressurization rate from the pressure after the third predetermined time to prepare the rigid polyurethane foam is done at a rate of 50 MPa/s to 150 MPa/s.

Releasing the polyurethane reaction mixture at the predetermined depressurization rate (foam expansion) can be controlled through the number of release valves in the system. The polyurethane reaction mixture can be depressurized inside a pressure vessel or could be injected into a cavity through an injection nozzle. For the various embodiments, the polyurethane reaction mixture can be released into standard atmospheric pressure (101.3 MPa). Alternatively, the polyurethane reaction mixture can be released into a pressure different from standard atmospheric pressure. For example, the polyurethane reaction mixture can be released into a pressure that is less than atmospheric pressure (e.g., into a vacuum) or into a pressure that is greater than atmospheric pressure. It is also possible that the rigid PU foam can undergo a post foam evacuation process (e.g., applying a vacuum to the rigid PU foam) in order to obtain a lower thermal conductivity for the rigid PU foam.

Polyol

The polyol of the present disclosure can be selected from the group consisting of a polyether polyol, a polyester polyol or a combination thereof. The polyol of the present disclosure can also include two or more of the polyether polyol, the polyester polyol or a combination thereof. The polyol of the present disclosure include compounds which contain two or more isocyanate reactive groups, generally active-hydrogen groups, such as primary and/or secondary hydroxyl groups (—OH). Other suitable isocyanate reactive groups include primary or secondary amines, and —SH.

The polyol(s) used in the polyol mixture may each have a functionality of at least 2 with an upper limit of 8. As used herein, the polyol functionality of the polyol is not an average value, but a discrete value for each polyether polyol. In addition, each polyol in the polyol mixture can have a hydroxyl number of 50 mg KOH/g to 1200 mg KOH/g. In a further embodiment, each polyol in the polyol mixture can have a hydroxyl number of 100 mg KOH/g to 800 mg KOH/g. So, the polyol mixture has a number averaged functionality of at least 2, preferably from 3 to 5, and an average hydroxyl value of at least 100 mg KOH/g. The hydroxyl number gives the hydroxyl content of a polyol, and is derived from method of analysis by acetylating the hydroxyl and titrating the resultant acid against KOH. The hydroxyl number is the weight of KOH in milligrams that will neutralize the acid from 1 gram of polyol. The equivalent weight of KOH is 56.1, hence:

Hydroxyl Number=(56.1×1000)/Equivalent Weight where 1000 is the number of milligrams in one grain of sample.

Examples of polyether polyols include the following commercially available compositions sold under the trade designator VORANOL™ RN482 (The Dow Chemical Company), VORANOL™ CP260 (The Dow Chemical Company), VORANOL™ RA640 (The Dow Chemical Company), TERCAROL® 5903 (The Dow Chemical Company), VORATEC™SD 301 (The Dow Chemical Company).

Other useful polyether polyols include those obtained by the alkoxylation of suitable starting molecules with an alkylene oxide, such as ethylene, propylene, butylene oxide, or a mixture thereof. Examples of initiator molecules include water, ammonia, aniline or polyhydric alcohols such as dihydric alcohols and alkane polyols such as ethylene glycol, propylene glycol, hexamethylenediol, glycerol, trimethylol propane or trimethylol ethane, or the low molecular weight alcohols containing ether groups such as diethylene glycol, dipropylene glycol or tripropylene glycol. Other initiators include pentaerythritol, xylitol, arabitol, sorbitol, sucrose, mannitol, bisphenol A and the like. Other initiators include linear and cyclic amine compounds which may also contain a tertiary amine, such as ethanoldiamine, triethanolamine, and various isomers of toluene diamine, methyldiphenylamine, aminoethylpiperazine, ethylenediamine, N-methyl-1,2-ethanediamine, N-methyl-1,3-propanediamine, N,N-dimethyl-1,3-diaminopropane, N,N-dimethylethanolamine, 3,3-diamino-N- methylpropylamine, N,N-dimethyldipropylenetriamine, aminopropyl-imidazole and mixtures thereof.

As provided herein, the polyether polyol can be a sucrose-initiated or a sorbitol-initiated polyether polyol. For example, the polyether polyol can be selected from the group consisting of a sucrose/glycerine-initiated polyether polyol, a sorbitol propoxylated polyol or a combination thereof. Sucrose may be obtained from sugar cane or sugar beets, honey, sorghum, sugar maple, fruit, and the like. Means of extraction, separation, and preparation of the sucrose component vary depending upon the source, but are known and practiced on a commercial scale by those skilled in the art. Sorbitol may be obtained via the hydrogenation of D-glucose over a suitable hydrogenation catalyst. Fixed beds and similar types of equipment are especially useful for this reaction. Suitable catalysts may include, for example, Raney™ (Grace-Davison) catalysts, such as employed in Wen, Jian-Ping, et. al, "Preparation of sorbitol from D-glucose hydrogenation in gas-liquid-solid three-phase flow airlift loop reactor," *The Journal of Chemical Technology and Biotechnology*, vol. 4, pp. 403-406 (Wiley Interscience, 2004), incorporated herein by reference in its entirety. Nickel-aluminum and ruthenium-carbon catalysts are just two of the many possible catalysts.

The polyol mixture can also include apolyester polyol, which is obtained by the condensation of appropriate proportions of glycols and higher functionality polyols with polycarboxylic acids. Examples of dicarboxylic acids are succinic acid, glutaric acid, adipic acid, suberic acid, azelaic acid, sebacic acid, decanedicarboxylic acid, malonic acid, dodecanedicarboxylic acid, maleic acid, aromatic dicarboxylic acids, and the like. Examples of dihydric and polyhydric alcohols include ethanediol, diethylene glycol, triethylene glycol, 1,2- and 1,3-propanediol, dipropylene glycol, 1,4-butanediol and other butanediols, 1,5-pentanediol and other pentanediols, and the like. A specific example of a polyester polyol is STEPANPOL® 3152, which is based on phtalic anhydride.

The polyol mixture of the present disclosure can include 50 weight percent (wt. %) to 99 wt. % of polyol, where the wt. % is based on a total weight of the polyol mixture. Combinations of more than one of each type of polyol (e.g., polyether polyol and polyester polyol) as discussed herein may also be selected, provided their combined percentages in the polyol mixture as a whole comply with the stated ranges.

The polyol mixture of the present disclosure can include 0.5 weight percent (wt. %) to 15 wt. % of surfactant, where the wt. % is based on a total weight of the polyol mixture. Preferably, polyol mixture of the present disclosure can include 1 wt. % to 2 wt. % of surfactant, where the wt. % is based on a total weight of the polyol mixture. Combinations of more than one type of surfactant, in addition to surfactant of the present disclosure, may also be selected, provided their combined percentages in the polyol mixture as a whole comply with the stated ranges.

Catalyst

The catalyst of the present disclosure can be selected from the group consisting of tertiary amines, tin and bismuth compounds, alkali metal and alkaline earth metal carboxylates, quaternary ammonium salts, s-hexahydrotriazines and tris(dialkylaminomethyl) phenols or a combination thereof. Examples of such catalysts include, but are not limited to, trimethylamine; triethylamine; dimethylethanolamine; N-methylmorpholine; N-ethylmorpholine; N,N-dimethylbenzyiamine; N,N-dimethylethanolamine; N,N,N',N'-tetramethyl-1,4-butanediamine; N,N-dimethylpiperazine; 1,4-diazobicyclo-2,2,2-octane; bis(dimethylaminoethyl)ether; bis(2-dimethylaminoethyl) ether; morpholine,4,4'-(oxydi-2,1-ethanediyl)bis; triethylenediamine; pentamethyl diethylene triamine; dimethyl cyclohexyl amine; N-acetyl N,N-dimethyl amine; N-coco-morpholine; N,N-dimethyl aminomethyl N-methyl ethanol amine; N,N,N'-trimethyl-N'-hydroxyethyl bis(aminoethyl) ether; N,N-bis(3-dimethylaminopropyl)N-isopropanolamine; N,N,N,N,N-Pentanmethyldiethylenetriamine; N,N-Dimethylcyclohexylamine; diethylene glycol, potassium acetate; Dimethylaminopropyl-hexahydrotriazine,N,N',N''; (N,N-dimethyl) aminoethoxy ethanol; N,N,N',N'-tetramethyl hexane diamine; 1,8-diazabicyclo-5,4,0-undecene-7, N,N-dimorpholinodiethyl ether; N-methyl imidazole; dimethyl aminopropyldipropanolamine; bis(dimethylammopropyl)amino-2-propanol; tetramethylaminobis propylamine); (dimethyl(aminoethoxyethyl))((dimethyl amine)ethyl)ether; tris(dimethylamino propyl) amine; dicyclohexyl methyl amine; bis(N,N-dimethyl-3-aminopropyl) amine; 1,2-ethylene piperidine and methyl-hydroxyethyl piperazine.In addition to or instead of the tertiary amine catalyst mentioned before. Of particular interest among these are tin carboxylates and tetravalent tin compounds. Examples of these include stannous octoate, dibutyl tin diacetate, dibutyl tin dilaurate, dibutyl tin dimercaptide, dialkyl tin diaikylmercapto acids, dibutyl tin oxide, dimethyl tin dimercaptide, dimethyl tin diisooctylmercaptoacetate, and the like.

The polyol mixture of the present disclosure can include 0.003 weight percent (wt. %) to 10 wt. % of the catalyst, where the wt. % is based on a total wreight of the polyol mixture. Preferably, polyol mixture of the present disclosure includes 2.5 wt. % to 3wt. % of the catalyst, where the wt. % is based on a total weight of the polyol mixture. Combinations of more than one of each type of catalyst as discussed herein may also be selected, provided their combined percentages in the polyol mixture as a whole comply with the stated ranges.

It is also possible that the catalyst could take the form of a self-catalytic polyol, as are known.

Isocyanate

In order to prepare the rigid PU foam, react the polyol mixture with the isocyanate in the presence of a blowing agent using the two-stage foaming process of the present disclosure. Preferably the isocyanate is selected from the group consisting of an aliphatic isocyanate, a cycloaliphatic isocyanate, an aromatic isocyanate, a polyisocyanateprepolymer or a combination thereof. These may further include multifunctional aromatic isocyanates. Also particularly preferred are polyphenylpolymethylenepolyisocyanates (PMDI). For example, isocyanate can be a polymeric methylene diphenyldiisocyanate. The polymeric form of MDI(p-MDI or PMDI) is typically 30 percent to 70 percent diphenylmethandiisocyanate, and the balance is higher molecular-weight fractions. Examples of preferred commercially available isocyanates include, those sold under the trade designator PAPI™ 27 and PAPI™ 135Cboth from The Dow Chemical Company. Other isocyanates useful in the present disclosure include tolylenediisocyanate (TDI), isophoronediisocyanate (IPDI) and xylene diisocyanates (XDI), and modifications thereof. These isocyanates may be used in combinations of two or more types.

PMDI in any of its forms is a preferred isocyanate for use with the present disclosure. When used, it preferably has an equivalent weight of 120 to 150, more preferably from 125 to 145. The isocyanate can have a functionality from 2.1 to 3. As used herein, the functionality of the isocyanate is the number of isocyanate groups [—N=C=O] present per molecule of isocyanate. The viscosity of the isocyanate component is preferably from 25 to 5,000 centipoise (cP) (0.025 to about 5 Pa*s), but values from 100 to 1,000 cP at 25° C. (0.1 to 1 Pa*s) are possible. Similar viscosities are preferred where alternative isocyanate components are selected.

The total amount of isocyanate used to prepare the rigid PU foam of the present disclosure should be sufficient to provide an isocyanate reaction index of from 0.6 to 5. Preferably the index is from 0.6 to 1.5. More preferably the index is from 0.7 to 1.2. An isocyanate reaction index of 100 corresponds to one isocyanate group per isocyanate reactive hydrogen atom present, such as from water and the polyol composition. For the mixing of the isocyanate with the polyol mixture in the vessel at the first reaction pressure the amount of isocyanate added to the vessel is sufficient to preferably provide a molar ratio of isocyanate groups to hydroxyl groups of greater than 1 to 5.

Blowing Agent

As discussed herein, the primary blowing agent used in the present disclosure is $CO_2$ that is introduced into the polyol mixture during the first and second stages of the two-stage foaming process of the present disclosure. Use of additional blowing agents is possible, but not a preferred embodiment.

The rigid PU foam of the present disclosure can be produced using the polyol mixture, the isocyanate and the two-stage foaming process as discussed herein. Batch, semi-continuous and continuous processes may be used in performing the two-stage foaming process as discussed herein. For example, for a semi-continuous process the polyol mixture can be loaded and sealed into a high pressure vessel. A high pressure mixer (e.g., a static mixer) is coupled to the high pressure vessel, and the high pressure mixer has an opening the size of which can be controlled to control the depressurization rate of the polyurethane reaction mixture emerging from the high pressure mixer.

For this example process, supercritical or subcritical $CO_2$ is injected into a high pressure vessel to provide a pressure at the first predetermined value on the polyol mixture. The pressure of the $CO_2$ at the first predetermined value is maintained in the vessel for the first predetermined time to increase a $CO_2$ concentration in the polyol mixture. A first amount of the polyol mixture is then pumped through a high pressure mixer (e.g., a static mixer) to preload the high pressure mixer and to maintain proper backpressure in the mixer. Afterward, polyol mixture and isocyanate are pumped at the desired flow-rate, pressure and temperature, to a high-pressure mixer. Further injection of $CO_2$ may be provided to set the pressure at a second predetermined value higher than the first predetermined value (and lower than the pressure in the delivery line of the pumps). The isocyanate reacts with the polyol mixture in the high pressure mixer for the third predetermined time (pump rates are set so that to obtain appropriate residence time). The polyurethane reaction mixture can then be released through the orifice at the predetermined depressurization rate.

Another example process, suitable for discontinuous production, involves the preparation in a high pressure vessel of a polyol mixture loaded with $CO_2$ at a first predetermined pressure for a first predetermined time, the supply by means of high pressure pumps of said polyol mixture containing $CO_2$ and of isocyanate to a mixing/dispensing apparatus comprising three chambers, a mixing chamber, a pre-curing chamber and a discharge chamber. In a preferred set-up the chambers are all provided with a piston and are constructed each orthogonal to the other. In the first chamber, the mixing chamber, the polyol mixture and the isocyanate are mixed by means of high pressure impingement. The reaction mixture runs to the pre-curing chamber. The piston of the pre-curing chamber is actuated in such a way to provide the required volume at controlled pressure during the transfer of the reaction mixture. Once all of the required reaction mixture has been transferred, the piston of the mixing chamber closes. Injection of additional $CO_2$ can take place during the transfer from the mixing chamber or alternatively in the pre-curing chamber. Optionally, the reaction mixture can be held for a second predetermined time, then pressure is increased to a second predetermined value and maintained for a third predetermined time. Once the reaction mixture in the pre-curing chamber is ready for being poured and/or injected, the piston of the discharge chamber opens. Proper synchronization of the pistons in the pre-curing chamber and the discharge chamber allows control of depressurization rate. The apparatus may advantageously be designed to allow self-cleaning at the end of pouring.

The rigid PU foam can be formed into a number of different shapes and on to or in to a number of different, structures. For example, such structures can include, but are not limited to, rigid or flexible facing sheet made of foil or another material, including another layer of similar or dissimilar PU or polyisocyanurate which is being conveyed, continuously or discontinuously, along a production line, or directly onto a conveyor belt. In alternative embodiments the composition for forming the rigid PU foam may be injected into an open mold or distributed via laydown equipment into an open mold or simply deposited at or into a location for which it is destined, i.e., a pour-in-place application, such as between the interior and exterior walls of a mold. In the case of deposition on a facing sheet, a second sheet may be applied on top of the deposited mixture. In other embodiments, the composition for forming the rigid PU foam may be injected into a closed mold, with or without vacuum assistance for cavity-filling. If a mold is employed, it can be a heated mold.

The mixture, on reacting, takes the shape of the mold or adheres to the substrate to produce the rigid PU foam of a more-or-less predefined structure, which is then allowed to cure in place or in the mold, either partially or fully. Suitable conditions for promoting the curing of the composition of the present disclosure include a temperature of typically from 40° C. to 80° C., preferably from 40° C. to 60° C., and more preferably from 40° C. to 50° C. Optimum cure conditions will depend upon the particular components, including catalysts and quantities used in preparing the composition for forming the rigid PU foam and also the size and shape of the article manufactured.

The result can be the rigid PU foam in the form of slabstock, a molding, a filled cavity, including but not limited to a pipe or insulated wall or hull structure, a sprayed foam, a frothed foam, or a continuously- or discontinuously-manufactured laminate product, including but not limited to a laminate or laminated product formed with other materials, such as hardboard, plasterboard, plastics, paper, metal, or a combination thereof. The rigid PU foam of the present disclosure can be used to form an insulation panel, where the insulation panel optionally includes a rigid or flexible facing sheet as discussed herein.

The composition for forming the rigid PU foam of the present disclosure can also include other optional additives. Such additives include, but are not limited to, phosphorous type flame retardants, chain extenders, silicone surfactants, physical blowing agents and water, chain extenders, oil, antioxidants, mold release agents, UV stabilizers, antistatic agents, antimicrobials, flow aids, processing aids, nucleating agents, pigments, fillers or a combination thereof. Examples of such phosphorous fire retardants include, but are not limited to, phosphates and halogen-phosphates such as triethyl phosphate (TEP) and tris(chloropropyl) phosphate (TCPP), among others.

The description hereinabove is intended to be general and is not intended to be inclusive of all possible embodiments of the disclosure. Similarly, the examples herein below are provided to be illustrative only and are not intended to define or limit the disclosure in any way. Those skilled in the art will be fully aware that other embodiments, within the scope of the claims, will be apparent, from consideration of the specification and/or practice of the disclosure as disclosed herein. Such other embodiments may include selections of specific components and proportions thereof; mixing and reaction conditions, vessels, deployment apparatuses, and protocols; performance and selectivity; identification of products and by-products; subsequent processing and use thereof; and the like; and those skilled in the art will recognize that such may be varied within the scope of the claims appended hereto.

Cell Opener

The rigid PU foam of the present disclosure can also be made with a cell opening surfactant, where it is possible to control the percentage of open-cell versus closed-cell in the rigid PU foam through the use of cell-opening surfactants with silicone based surfactants. Examples of such cell-opening surfactants include, but are not limited to those sold by Dupont™ and Maysta™ under the trade designator GPL-105, GPL-100, AK-9903 and those sold by Momentive™ under the trade designator Niax Silicone L-6164.

The polyol mixture of the present disclosure can include 5 weight percent (wt. %) to 10 wt. % of a cell-opening surfactant, where the wt. % is based on a total weight of the polyol mixture. The percentage of open cell can be measured using ASTM-D2856.

EXAMPLES

Materials

TABLE 1

Materials for Examples and Comparative Example

| Component | Grade name | Characteristic | Weight (%) | Supplier |
|---|---|---|---|---|
| Fluoro-Surfactant | Capstone ® FS3100 | | | DuPont Fluoro-Surfactant |
| Polyol | SD301 | F = 3; OH n° 160, PO based | 43.67 | The Dow Chemical Company (TDCC) |
| Polyol | CP260 | F = 3, OH n° 650, PO based | 34.9 | TDCC |
| Polyol | T5903 | F = 4; OH n° 440, PO based | 8.72 | TDCC |
| Catalyst | PC-41 | Dimethylaminopropylhexahydrotriazine, N,N',N''- | 0.52 | Air product |
| Catalyst | PC-5 | N,N,N,N,N-Pentanmethyldiethylenetriamine | 0.45 | Air product |
| Catalyst | PC-8 | N,N-Dimethylcyclohexylamine | 1.74 | Air product |
| Surfactant | AK8850 | Silicone surfactant | 3 | Dearmate |
| Cell opener | L6164 | Cell opener | 7 | Momentive |
| Total | | | 100 | |
| Isocyanate | Papi-135C | PMDI | 101 (Index = 1.15) | TDCC |

F—Functionality;
OH n°—hydroxyl number

Example 1

Form the surfactant of Example 1 as follows. Add 50 grams (g) of Capstone® FS3100 (50 g) to a three-neck flask. Heat the contents of the three-neck flask to 80° C. and then stir the content of the three-neck flask for 1 hour under vacuum (300 mmHg) to remove residual water. Allow the contents of the three-neck flask to cool to room temperature (23° C.) while purging the environment above the liquid with dry nitrogen. Add 50 g of Papi-135C to the three-neck flask. Allow the contents of the three-neck flask to react at 50° C. under mechanical stirring for 3 to 5 hours.

Characterization of Example 1

Measure isocyanate (NCO) content in Example 1 as follows. Determine NCO content through titration. Use the following reagents: dibutylamine (DBA); dimethylformamide (DMF); isopropanol (IPA); toluene (dried overnight with sieve); mixed solvent of DBA and DMF according to the volume ratio of 155 ml DBA to 350 ml DMF—dry the mixed solvent with sieve overnight and 0.5 Molar (M) hydrochloric acid.

The titration process is as follows.

Blank Test

For the Blank Test prepare a blank test mixture by mixing 6 milliliters (ml) of dried toluene, 10 ml of isopropanol and 2 ml of the dried mixture of DBA and DMF in a glass vial for 10 minutes using a vortex mixer. Use 0.5 M of hydrochloric acid to titrate the blank test mixture, where the volume of consumed hydrochloric acid is "B" ml. Repeat the titration of the blank test mixture two more times, where the differences in the volume of hydrochloric acid consumed should be less than 0.05 ml for each test.

Sample Test

For the Sample Test use the blank test mixture prepared for the Blank Test. Use 0.5 ml of hydrochloric acid to titrate the blank test mixture, where the volume of consumed hydrochloric acid is "S" ml. Weigh samples of Example 1 (Table 2, below), and place each sample into a 40 ml glass vial. Titrate each the sample of Example 1 using the 0.5 M hydrochloric acid. Calculate the isocyanate content according to the following formula:

$$NCO\% = \frac{4.202 \times (B-S) \times N}{W},$$

Where,

B=volume of consumed hydrochloric acid in blank test;

S=is the volume of consumed hydrochloric acid in sample test;

N=concentration of hydrochloric acid (0.5 M).

W=weight of sample.

The results of isocyanate content are shown in Table 1.

TABLE 2

Isocyanate Content of Example 1

| Runs of Sample Test on Example 1 | Sample Weight (g) | Vol. Consumed for Sample (ml) | Vol. Consumed for Blank (ml) | N/HCl (mol/L) | NCO wt. % | Avg. NCO wt. % |
|---|---|---|---|---|---|---|
| (1) | 0.2838 | 4.9692 | 6.7054 | 0.5037 | 12.95 | 13 |
| (2) | 0.3274 | 4.7021 | | | 12.94 | |
| (3) | 0.2921 | 4.8967 | | | 13.11 | |

Table 2 shows the average value for the weight percent in the Example 1 (based on total weight of Example 1) is 13 wt. %.

Structural characterization of Example 1

IR Characterization

Use a Nicolet 6700 FTIR to analyze the structure of Example 1. FIG. 1 shows the IR curves for the Capstone® FS3100, the Papi-27 and Example 1. The IR curve for the Capstone® FS3100 shows a peak at 3400 cm$^{-1}$, which is the characteristic peak of hydroxyl group. This characteristic peak of hydroxyl group is, however, missing in Example 1. This indicates that the hydroxyl groups in Capstone® FS3100 have fully reacted with the isocyanate groups in the Papi-27. The peak at 2270 cm$^{-1}$ in the curve of the Papi-27is the characteristic peak of isocyanate group, it can be also found in the curve of Example 1.

$CO_2$ Solubility of Example 1 and Papi-135C

Measure the solubility of $CO_2$ in Papi-135C and the Surfactant of Example 1 using a magnetic suspension balance (MSB, Mettler AT261, German) (see Sato etal., Solubilities and diffusion coefficients of carbon dioxide in poly (vinyl acetate) and polystyrene. *The Journal of Supercritical Fluids*. 2001; 19(2): 187-198; Lei etal., Solubility, swelling degree and crystallinity of carbon dioxide-polypropylene system. The Journal of Supercritical Fluids. 2007; 40(3): 452-461; Sato etal. , Solubility and Diffusion Coefficient of Carbon Dioxide in Biodegradable Polymers. Industrial & Engineering Chemistry Research. 2000; 39(12):4813-4819; and Sato etal., Solubility of carbon dioxide in PPO and PPO/PS blends. Fluid Phase Equilibria. 2002; 194-197:847-858).

Table 3 lists the solubility of $CO_2$ in Papi-135C and the Surfactant of Example 1determined from the MSB experiments at 40° C. As shown in Table 3, the solubility of $CO_2$ increases with increasing saturation pressure. There was zero $CO_2$ solubility for both the Papi-135C and the Surfactant of Example 1 when the $CO_2$ was 0. As shown in Table 3, the solubility of $CO_2$ in the surfactant of Example 1 was higher than that of Papi-135C (PMDI), especially under high pressure (6 MPa), where there was an increase of more than 20 wt % in the solubility of $CO_2$.

TABLE 3

Solubility of $CO_2$ in Papi-135C and the Surfactant of Example 1 at Different $CO_2$ Pressure.

| | $CO_2$ saturation pressure (wt. %) | | |
|---|---|---|---|
| | At 2 MPa | At 4 MPa | At 6 MPa |
| Papi-135C | 4 | 9.7 | 19.3 |
| Surfactant of Example 1 | 3.9 | 10.6 | 23.9 |

Polyurethane (PU) Foam Examples and Comparative Examples

Table 4 and 5 provide formulations for the Polyol Mixture (Table 4) and the Isocyanate Mixture (Table 5) used in forming the PL* Foam Examples and Comparative Examples of the present disclosure.

TABLE 4

Materials for the Polyol Mixture

| Component | Grade name | Characteristic | Weight (%) | Supplier |
|---|---|---|---|---|
| Polyol | SD301 | F = 3; OH n° 160, PO based | 43.67 | TDCC |
| Polyol | CP260 | F = 3, OH n° 650, PO based | 34.9 | TDCC |
| Polyol | T5903 | F = 4; OH n° 440, PO based | 8.72 | TDCC |
| Catalyst | PC-41 | N,N'N"-Dimethylaminopropylhexahydrotriazine | 0.52 | Air Products and Chemicals, Inc. (Air Products) |
| Catalyst | PC-5 | N,N,N,N,N-Pentanmethyldiethylene triamine | 0.45 | Air Products |
| Catalyst | PC-8 | N,N-Dimethylcyclohexylamine | 1.74 | Air Products |
| Surfactant | AK8850 | Silicone surfactant | 3 | Dearmate Chemical Company |
| Cell opener | Niax™ Silicone L-6164 | Cell opener | 7 | Momentive Performance Materials Inc. |
| Total | | | 100 | |
| Isocyanate Mixture (Table 5) | | NCO group supplier | 144.9[1] | |

[1]Basis for PU foam is in pph, with 100 parts of the polyol mixture to 144.9 parts of the isocyanate mixture

TABLE 5

| Materials for the Isocyanate Mixture | | | | | |
|---|---|---|---|---|---|
| Surfactant | Example 1 | | 56 wt. % | | 5 |
| Isocyanate | Papi-135C | PMDI | 44 wt. % | TDCC | |

Processing Conditions

Table 6 lists the processing conditions for the PU Foam Examples and PU Foam Comparative Examples.

TABLE 6

Processing Parameters for Preparing PU Foams

| | Temperature (° C.) | Reaction pressure (MPa) (First Predetermined Value) | Reaction time (s) (First Predetermined Time) | Saturation pressure (MPa) (Second Predetermined Value) | Predetermined Depressurization rate (MPa/s) |
|---|---|---|---|---|---|
| Comparative PU Foam Example A | 40 | 8 | 30 | 15 | 400 MPa/s |
| Comparative PU Foam Example B | 40 | 8 | 30 | 15 | 108 MPa/s |
| PU Foam Example 1 | 40 | 8 | 30 | 15 | 108 MPa/s |

Prepare Comparative PU Foam Examples A and B and PU Foam Example 1 by weighing and adding all raw materials of the polyol mixture (polyol, catalyst and surfactant) for the Example (seen in Table 4) to a Teflon® bottle. Mix the content of the Teflon® bottle at 3000 rotations per minute (rpm) for 2 minutes at room temperature (23° C.) and pressure (101 KPa) with a high speed mixer (INVT SFJ-400, Moderner, China). After mixing remove the lid of the Teflon® bottle and allow the contents of the Teflon® bottle to equilibrate (release of air bubbles from the polyol mixture) at room temperature and pressure for one to two hours.

Add the polyol mixture from the Teflon® bottle to a high pressure reactor and place in a high pressure autoclave that is located in a temperature controlled water bath. Provide a sufficient headspace volume above the polyol mixture to allow for foam expansion. Seal the high pressure autoclave and purge the atmosphere with carbon dioxide ($CO_2$) to remove air and water ($H_2O$) from the high pressure autoclave. Fleat the contents of the high pressure reactor using the temperature controlled water bathset to 40° C. Introduce carbon dioxide into the high pressure autoclave to increase the pressure inside the high pressure reactor to 8 mega Pascals (MPa). Maintain the pressure and the temperature inside the high pressure reactor at 8 MPa and 40° C. for 30 minutes to facilitate $CO_2$ saturation of the polyol mixture. As discussed above, this first $CO_2$ saturation step helps to build up the initial $CO_2$ concentration and slow down (or decrease) the reaction rate of polyol/isocyanate, so that in following steps, there would be enough time for more $CO_2$ dissolved into polyol phase.

After 30 minutes add the Isocyanate Mixture (Table 5) and stir the contents of the reactor for 1 minute. Introduce carbon dioxide into the high pressure autoclave to increase the pressure inside the high pressure reactor to 15 MPa. Allow the contents of the high pressure reactor to react for the reaction time of 3 minutes to 30 minutes. After the reaction time release the pressure inside the high pressure reactor to atmosphere pressure at the rate indicated in Table 5.

Characterization of PU Foam Example 1 and Comparative PU Foam Examples A and B

Number Average Cell Size Measurement

Fracture the PU Foam sample utilizing liquid nitrogen. Sputter coat the fractured face of the PL) foam sample with iridium. Use a scanning Electron Microscopy (SEM, FEI Nova Nano SEM 630) to obtain images at different working distances and different magnification. Obtain the number average ceil size through analysis of the SEM images by using Image-Pro Plus software.

Mass Density Measurement

Measure mass density of foam samples according to ASTM D792-00, which includes weighing the PU foam in water using a sinker.

Figure 2:
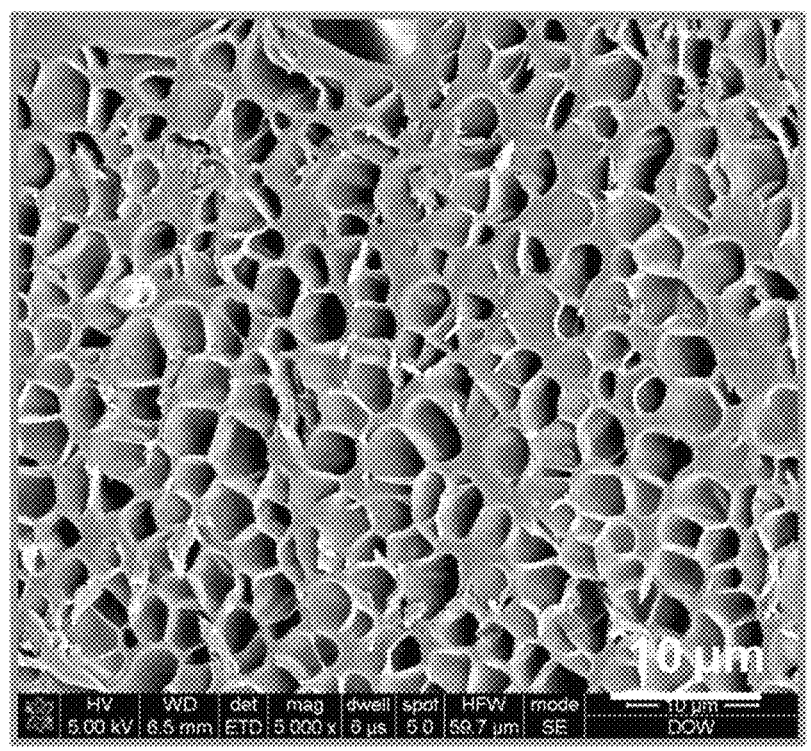
FIG. 2 is a Scanning Electron Microscopy (SEM) image of a polyurethane (PU) foam of Example 1 of the present disclosure.
Figure 3:
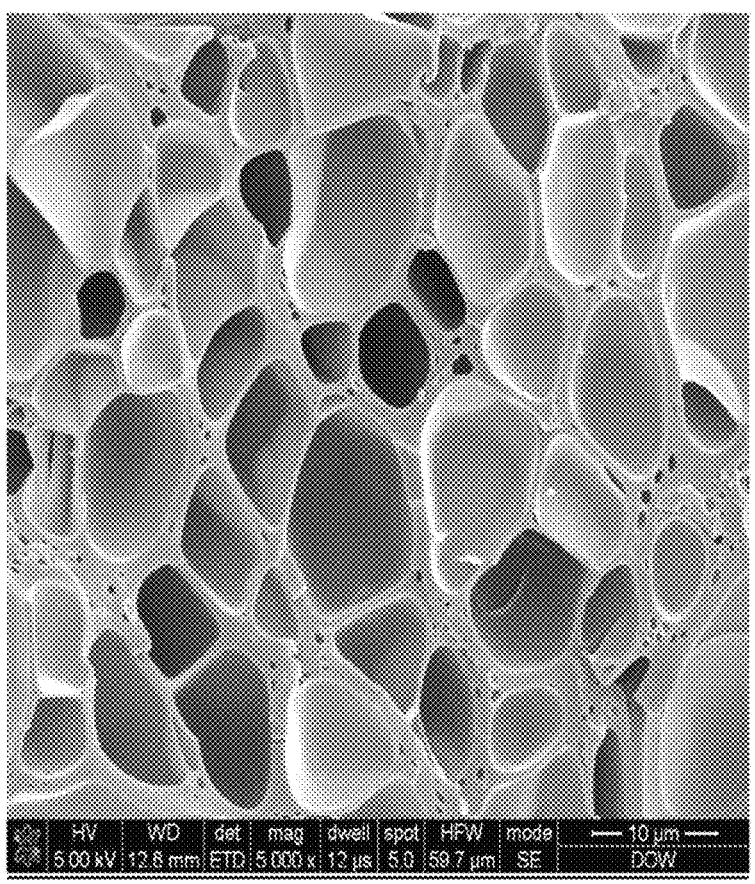
FIG. 3 is an SEM image of a PU foam of Comparative PU Foam A of the present disclosure.
Figure 4:
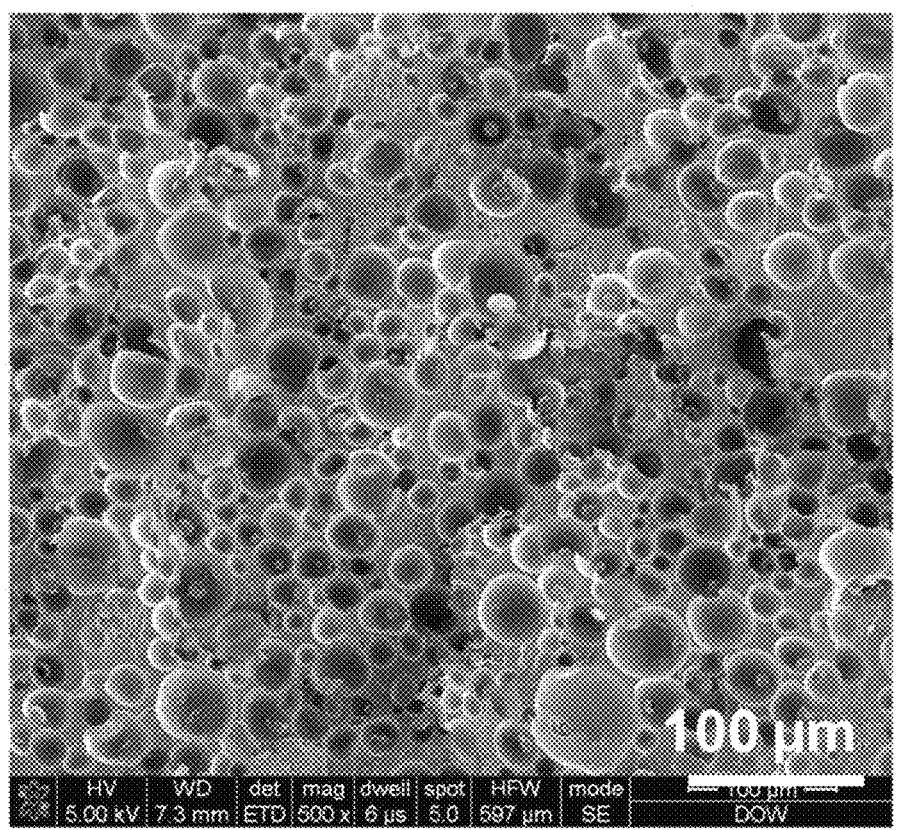
FIG. 4 is an SEM image of a PU foam of Comparative PU Foam B of the present disclosure.

The results of the characterization are as follows. The SEM image of PU Foam Example 1 is shown in FIG. 2. For PU Foam Example 1, even under very low depressurization rate of 108MPa/s, which is the same as Comparative PU Foam Example B, the PU foam demonstrated a number average cell size smaller than 10 micron and porosity as high as 82.5%. As shown in FIG. 3, Comparative PU Foam A had a uniform cell size distribution with average cell size of 6.8 microns, and porosity of 85.8%. As shown in FIG. 4, Comparative PU Foam B had a cell size distribution between 50-100 micron which the porosity was also decreased to 66.3%. These results suggest that the surfactant of Example 1 helps to enhance the affinity and solubility for the $CO_2$ and the isocyanate. This enhancement leads to the small number average cell size (e.g., smaller than 10 micron) along with high porosity even with a low depressurization rate (108 MPa/s).

The invention claimed is:

1. A surfactant having the formula:

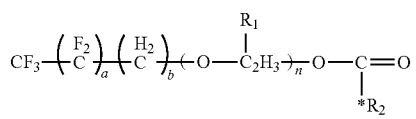

where a is an integer from 1 to 10, b is an integer from 0 to 10, $R_1$ is —$CH_3$ or —H, n is an integer from 1 to 20, and $R_2$ is a moiety selected from the group consisting of:

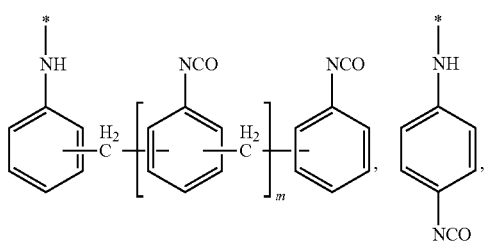

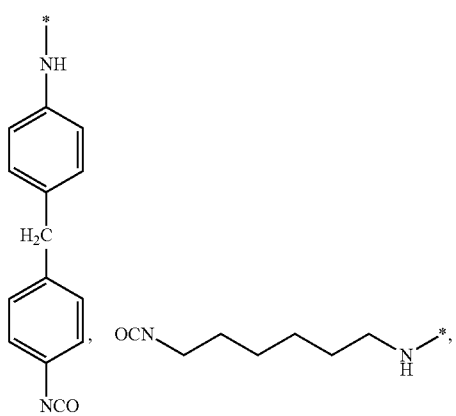

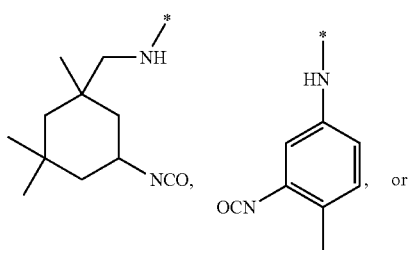

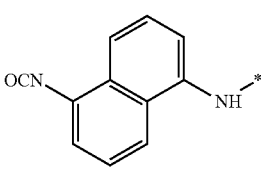

where m is an integer from 0 to 4.

2. The surfactant of claim 1, wherein the formula is:

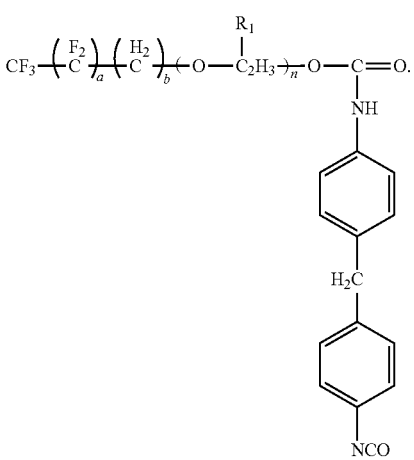

3. The surfactant of claim 1, where the formula is:

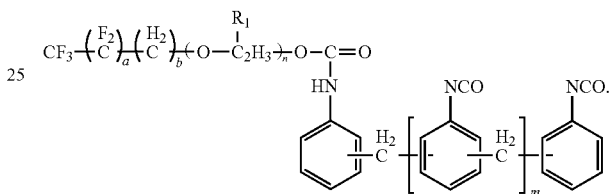

4. The surfactant of claim 1, where a is an integer from 5 to 7, b is an integer from 2 to 10 and $R_1$ is —H.

5. The surfactant of claim 4, where a is 7.

6. The surfactant of claim 1, wherein based on the total weight of the surfactant, the surfactant has 0.1 weight percent (wt. %) to 50 wt. % fluorine (F) and 3 wt. % to 25 wt. % isocyanate.

7. A method for preparing a rigid polyurethane foam, comprising:
using carbon dioxide to provide a pressure at a first predetermined value on a polyol mixture that includes a polyol, a catalyst and a surfactant a provided in claim 1;
maintaining the pressure at the first predetermined value for a first predetermined time;
mixing an isocyanate with the polyol mixture to form a polyurethane reaction mixture;
optionally maintaining the pressure on the polyurethane reaction mixture at the first predetermined value for a second predetermined time;
increasing the pressure on the polyurethane reaction mixture from the first predetermined value to a second predetermined value greater than the first predetermined value; and
releasing the polyurethane reaction mixture at a predetermined depressurization rate from the pressure after a third predetermined time to prepare the rigid polyurethane foam, where the third predetermined time is less than 30 minutes.

* * * * *